United States Patent [19]

Blackborow

[11] Patent Number: 5,519,092
[45] Date of Patent: May 21, 1996

[54] SUBSTITUTED ACYLATING AGENTS

[75] Inventor: John R. Blackborow, Edinburgh, Scotland

[73] Assignee: BP Chemicals Limited, London, England

[21] Appl. No.: 462,008

[22] Filed: Jun. 5, 1995

[30] Foreign Application Priority Data

Apr. 7, 1995 [GB] United Kingdom .................. 9507305

[51] Int. Cl.$^6$ ...................................... C08F 8/00
[52] U.S. Cl. ........................................ 525/285; 525/301
[58] Field of Search ...................... 525/285, 301

[56] References Cited

U.S. PATENT DOCUMENTS

| | | | |
|---|---|---|---|
| 5,137,978 | 8/1992 | Degonia et al. | 525/285 |
| 5,286,799 | 2/1994 | Harrison et al. | 525/285 |
| 5,319,030 | 2/1994 | Harrison et al. | 525/285 |
| 5,429,757 | 7/1995 | Mishra et al. | 525/285 |
| 5,454,964 | 10/1995 | Blackborow | 525/285 |

*Primary Examiner*—Bernard Lipman
*Attorney, Agent, or Firm*—Brooks Haidt Haffner & Delahunty

[57] ABSTRACT

This invention relates to a process for making substituted acylating agents by the reaction of an enophile containing at least one carboxyl group with a polyolefin selected from polypropylene and poly(iso)butene. To the reaction mixture is added an at least (a)one olefin of the formula $(R)(R^1).C\!\!=\!\!C.(R^2)(R^3)$ wherein at least one of R, $R^1$, $R^2$ and $R^3$ is hydrogen and at least one of the other three is (i) an alkyl group having at least 3 carbon atoms or (ii) at least one of $R^2$ and $R^3$ together with $R^1$ forms a cycloaliphatic ring such that the olefin has at least 5 carbon atoms in a linear hydrocarbyl chain, or, (b) one adduct of said olefin of formula (I) with the reactant enophile. The products of the reaction have a substantially reduced amount of resin.

10 Claims, No Drawings

SUBSTITUTED ACYLATING AGENTS

The present invention relates to method of producing substituted acylating agents such as e.g. maleinised polyolefins which significantly reduces the amount of resins formed during the process.

It is well known in the art to make poly(iso)butenyl succinic anhydrides (hereafter "PIBSAs") by the reaction of a poly(iso)butene with maleic anhydride under thermal conditions. However, the PIBSAs made by conventional routes, e.g. by the thermal maleinisation of polyolefins such as poly(iso)butene normally contain undesirable resins primarily due to the resinification of the maleic anhydride reactant under the reaction condition. This resin manifests itself in many titans such as e.g. fines or turbidity in the reaction product or fouling in the reactor. The presence of such resins in the product not only gives a significant discrepancy between the real and apparent succinylation ratios in the maleinised product (due to the presence of soluble resinified maleic anhydride) but may also adversely affect the detergency properties of additives such as the corresponding succinimides derived therefrom. Whilst some of these problems of resin formation may be mitigated by the method of manufacturing these PIBSAs by the intermediate chlorination route, this is also undesirable because the presence of any chlorine in the succinimide product derived therefrom may give rise to undesirable chlorinated products under the conditions prevalent in an internal combustion engine where such additives are used. In addition, the presence of chlorine is, in any case, environmentally undesirable should such products or the packaging containing such products be discharged into the environment accidentally or as waste.

It has now been found that maleinised polyolefins which have a substantially reduced amount of undesirable and resinous products can be produced by the addition of a further reactant to the maleinisation reaction.

Accordingly, the present invention is a process for making substituted acylating agents having a substantially reduced amount of resins by the thermal reaction of an enophile containing at least one carboxyl group and capable of forming resins under the reaction conditions with a polyolefin selected from polypropylene and poly(iso)butene, said process comprising adding to the reaction mixture comprising the enophile and the polyolefin at least:

a. one olefin of the formula (I):

wherein at least one of R, $R^1$, $R^2$ and $R^3$ is hydrogen and at least one of the other three is i. an alkyl group having at least 3 carbon atoms, or,
  ii. at least one of $R^2$ and $R^3$ together with $R^1$ forms a cycloaliphatic ring such that the olefin has at least 5 carbon atoms in a linear hydrocarbyl chain, or, b. one adduct of said olefin of formula (I) with the reactant enophile.

By the expression "linear hydrocarbyl chain" as used herein and throughout the specification is meant that said chain is substantially herein from branched chains. For the avoidance of doubt it should be understood that for the purposes of the present invention cylcic olefins, such as e.g. cyclohexene, which have 5 or more carbon atoms in the ring structure are considered to contain a linear hydrocarbyl chain.

The enophile containing at least one carboxyl group which is reacted with the polyolefin in a thermal reaction is suitably a carboxylic acid or an anhydride which has at least one active unsaturated linkage capable of enophilic addition to the polyolefin. Typical examples of such enophiles include maleic acid and maleic anhydride. Substituted acylating agents of the present invention are typically represented by a maleinised polyolefin such as a polypropenyl or a poly(iso)butenyl substituted succinylating agent. In this reaction, it has been found that addition of at least one olefin of formula (I) having at least 5 carbon atoms or an adduct thereof with the reactant enophile reduces the formation of resins, which are also known as tar, during the reaction. The olefins of formula (I) suitably have from 5–30 carbon atoms, preferably from 8–20 carbon atoms, typically 12–18 carbon atoms. These olefins (I) may be a single olefin or a mixture of olefins. A typical example of such olefins is the mixture of olefins derived from the so called "SHOP" process as manufactured and sold by Shell Chemicals. The amount of olefins (I) or an adduct thereof with the reactant enophile added to the reaction mixture is suitably in the range from 0.1 to 10% w/w of the total polyolefins in the reaction mixture and is preferably from 0.1– 5% w/w of the polyolefin reactant.

The olefin (I) or the adduct thereof with the reactant enophile can be added to the reactants before or during the reaction between the enophile and the polyolefin. It is possible that under the reaction conditions used, where an olefin (I) is added to the reaction mixture an adduct of the olefin (I) may be formed in situ with the reactant enophile, thereby creating a reaction mixture which contains as additive both the olefin (I) and its adduct with the enophile.

The reaction temperature for this reaction between the enophile such as e.g. maleic anhydride and the polyolefins is suitably from 100° to 240° C., preferably from 180° to 240° C. The reaction is carried out in the substantial absence of free radicals or free-radical precursors such as e.g. oxygen or air.

The reaction may be carried out at atmospheric or superatmospheric pressure and the pressure may vary during the reaction. In each case, the use of the claimed additives under the same conditions results in reduced tar formation when compared with the corresponding reaction in the absence of such additives.

The polyolefin can be reacted with an enopohilc such as e.g. maleic anhydride to form the maleinised polyolefin as stated above. No chlorination of the polyolefin is needed to facilitate the reaction with an enophile such as maleic anhydride. The reaction is suitably carried out in the presence of a high boiling solvent although a solvent is not essential for the polyolefin can be reacted with an enophile in its molten form. For this reaction, it is preferable that the enophile such as maleic anhydride and polyolefin are substantially dry, ie free of water and other impurities, in order to miniraise the formation of undesirable by-products.

If it is desired to recover some of the unreacted olefin (I) at end of the reaction for the purposes of recycling, it would be desirable to chose an olefin having a vapour pressure which would enable it to be removed along with the unreacted enophile such as maleic anhydride by conventional means such as e.g. using reduced pressures and elevated temperature. During the reaction of the enophile with the polyolefin, some of the olefins (I) are themselves converted to the corresponding alkenyl adducts; a typical example is the formation of an alkenyl succinic anhydrides when the enophile used is maleic anhydride. The presence of such alkenyl adducts such as alkenyl succinic anhydrides, in addition to reducing tar formation in the reaction as described above, in the reaction product may make small but useful contributions to the detergency properties of e.g. any succinimides derived from the maleinised polyolefin when such imides are used as additives to fuels and lubricants.

In a typical reaction, a poly(iso)butene (hereafter "PIB"), which may be a polymer of n-butene, iso-butene or a copolymer of the two from a mixed feedstock comprising both n- and iso-butenes, is reacted with maleic anhydride (hereafter "MA") in the presence of an olefin (I). This reaction gives rise to a poly(iso)butenyl succinic anhydride (hereafter "PIBSA"). PIBs when used for producing these PIBSAs may be conventional PIBs such as HYVIS® or PIBs which have a high terminal unsaturation, ie PIBs chains which terminate in a —$C(CH_3)$=$CH_2$ function. Conventional PIBs usually have less than 50% of the chains with terminal unsaturation and most commercial products have less than 20% of chains with terminal unsaturation. Whilst the present invention is applicable to conventional PIBs, the PIBs used for producing the PIBSAs of the present invention can have 20% of the chains with terminal unsaturation. The number average molecular weight (hereafter "Mn") of the PIB when used is at least 500, and is preferably >750. Typical examples of such PIBs are NAPVIS® (ex BP Chemicals Ltd), PARAPOL® (ex Exxon Chemicals), ULTRAVIS® (ex BP Chemicals Ltd) and INDOPOL® (ex Amoco). Such PIBs can be produced substantially free of chlorine (ie $\leq$120 ppm) by the processes described in the art.

The process of the present invention is further illustrated with reference to the following Examples (according to the invention) and Comparative Tests (not according to the invention):

Comparative Tests (CT1–CT3)

Reactions at superatmospheric pressure:

CT1. A sample of Parapol® 950 polybutene (200 g,Mn=935 by GPC, viscosity 235 mm$^2$/s (235 cSt) ex Exxon Chemicals), was placed in a 600 ml Parr autoclave together with maleic anhydride (61.8 g). The autoclave was purged with nitrogen and sealed and heated to 235° C. with stirring. This temperature was maintained for 4 hours; the autoclave was then cooled to about 80° C. and the pressure developed during the reaction released. The contents of the autoclave were placed in a Buchi rotavapor and unreacted maleic anhydride was removed under vacuum at 200° C. in a stripping step. The remaining material was cooled and dissolved in heptane and filtered through a filter cake (bed) of Celite; the Celite bed was washed with heptane and the combined filtrates from the heptane solution and heptane washings was evaporated (at 180° C. under vacuum) to remove the heptane solvent. The resulting residual material had an acidity of 96 mgKOH/g. The filter cake Celite was washed through with acetone to dissolve the tar adhering thereto and the tar solution was subsequently evaporated to remove all solvents under vacuum. The total weight of tar recovered in this way was 21.6 g. In the stripping step 15.3 g of unreacted maleic anhydride was also recovered. The final reaction pressure developed was about 130 psig.

CT2. A sample of Hyvis® 10 polybutene (200 g,Mn=924 by GPC, viscosity 218 mm$^2$/s (218 cSt), ex BP Chemicals Ltd) was place in a 600 ml Parr autoclave with maleic anhydride (63.7 g). The autoclave was subjected to the same procedure as in CT1 above and the products were subjected to the same workup procedure. The stripped and filtered reaction product had an acidity of 103.6 mgKOH/g and the total tar recovered was 23.79 g. In the stripping step 14.5 g of unreacted maleic anhydride was also recovered. The final reaction pressure developed was about 130 psig. This experiment was repeated a further six times under identical conditions for verification and the average acidity of the stripped product was 100 mgKOH/g and the average amount of total tar recovered was 24 g. In each of these repeat experiments the final reaction pressure developed was about 130 psig.

CT3. A sample of Ultravis® 10 polybutene (100g,Mn=940 by GPC, ex BP Chemicals Ltd) and maleic anhydride (32 g) were placed in a 300 ml Parr autoclave and the autoclave purged with nitrogen and sealed. The autoclave was heated to 250° C. with stirring and held at this temperature for 4 hours. The autoclave was cooled to about 80° C. and the pressure released and the contents of the opened autoclave placed in a Buchi rotavapor. Unreacted maleic anhydride was stripped from this product under vacuum at 200° C. and the cooled residual material dissolved in heptane. The heptane solution was filtered through a Celite filter cake into a Buchner filter flask; the cake was washed with heptane after the filtration and the filtrate and washings combined and evaporated to remove the heptane at up to 80° C. under vacuum. The acidity of the resulting material was found to be 138.7 mgKOH/g. The filter cake was washed with acetone to dissolve and remove tar therefrom and the acetone solution was evaporated under vacuum to remove all acetone. The total tar recovered was 10.9 g. The final reaction pressure developed was about 250 psig.

Examples 1–6

Reactions at superatmospheric pressure:

1. Parapol® 950 polybutene (200 g,Mn=935 by GPC, ex Exxon Chemicals) and maleic anhydride (62 g) were placed in a 600 ml Parr autoclave together with an olefin (I), octadecene (12 g). The autoclave was then purged with nitrogen and sealed and then heated with stirring to 235° C. Thereafter the same procedure as described in CT1 above was followed to work-up the products by stripping and washing. The resultant reaction product, after stripping, had an acidity of 117.2 mgKOH/g and the total amount of tar recovered was 4.5 g. In the stripping step, 30.2 g of unreacted maleic anhydride was recovered. The final reaction pressure developed was about 75 psig.

2. Hyvis® 10 polybutene (200 g,Mn=924 by GPC, viscosity 218 mm$^2$/s (218 cSt), ex BP Chemicals Ltd), maleic anhydride (61 g) and octadecene (15 g) were placed in a 600 ml Parr autoclave and the autoclave was purged with nitrogen, sealed and heated to 235° C. with stirring following the same procedure as described in CT1 above. A stripped and filtered product ws obtained with an acidity of 121.6 mgKOH/g and the total tar recovered was 4.8 g. In the stripping step 29.9 g of unreacted maleic anhydride was recovered. The final reaction pressure developed was about 75 psig.

3. A sample of Ultravis® 10 polybutene (100 g,Mn=940 by GPC, ex BP Chemicals Ltd), maleic anhydride (32.3 g) and octadecene (4 g) were placed in a 300 ml Parr autoclave which was purged with nitrogen and sealed. Thereafter, following the same procedure as in CT3 above, a stripped and filtered product having an acidity of 151.6 mgKOH/g was obtained and a total amount of tar of 3.6 g was also recovered. The final reaction pressure developed was about 140 psig.

4. Hyvis® 10 polybutene (200 g,Mn=924 by GPC, viscosity 218 mm$^2$/s (218 cSt), ex BP Chemicals Ltd), maleic anhydride (61 g) and dodecene (8 g) were placed in a 600 ml Parr autoclave which was purged with nitrogen, sealed and heated at 235° C. with stirring. Thereafter, following the same procedure as described in CT1 above, a stripped, filtered product was obtained with an acidity of 112.8 mgKOH/g. The total amount of tar in this example was 10.2 g and 19 g of unreacted maleic anhydride was recovered in the stripping step. The final reaction pressure developed was about 100 psig.

5. Parapol® 950 polybutene (100 g, Mn=935 by GPC, ex Exxon Chemicals), maleic anhydride (31.4 g) and dodecenyl succinic anhydride (5 g, an adduct of dodecene and maleic anhydride, hereafter "DD-SA") were placed in a 300 ml Parr autoclave which was then purged, sealed and heated to 235° C. with stirring. Exactly the same procedure as used in CT1 above was used to workup the reaction mixture. The stripped, filtered product had an acidity of 105.8 mg KOH/g and the total amount of tar recovered was 8.1 g. In the stripping step, 10.2 g of unreacted maleic anhydride was recovered. The final reaction pressure developed was about 100 psig.

6. Hyvis® 10 polybutene (200 g, Mn=924 by GPC, viscosity 218 mm$^2$/s (218 cSt), ex BP Chemicals Ltd), maleic anhydride (61 g) and dodecenyl succinic anhydride (5 g, "DD-SA") were placed in a 600 ml Parr autoclave which was then purged, sealed and heated to 235° C. with stirring. Exactly the same procedure as used in CT1 above was used to work-up the reaction mixture. The stripped, filtered product had an acidity of 120.8 mg KOH/g and the total amount of tar recovered was 5.0 g. In the stripping step, 27 g of unreacted maleic anhydride was recovered. The final reaction pressure developed was about 75 psig.

Comparative Tests (CT4–CT9)

The following reactions were carried out using an identical procedure to CT1 above which demonstrate that the addition of short chain anhydrides, ie ≦C5, are not advantageous or are positively detrimental to the reduction of resin.

CT4. Hyvis® 10 polybutene (100 g, Mn=924 by GPC, viscosity 218 mm$^2$/s (218 cSt), ex BP Chemicals Ltd), maleic anhydride (30.5 g) and isobutenyl succinic anhydride (5g, an adduct of isobutene and succinic anhydride, hereafter "IBSA") were placed in a 300 ml Parr autoclave which was then purged, sealed and heated to 235° C. with stirring. Exactly the same procedure as used in Example 3 above was used to work-up the reaction mixture. The stripped, filtered product had an acidity of 64.8 mg KOH/g and the total amount of tar recovered was 22.7 g. In the stripping step, 5.4 g of unreacted maleic anhydride was recovered. The final reaction pressure developed was about 220 psig.

CT5. Hyvis® 10 polybutene (100 g, Mn=924 by GPC, viscosity 218 mm$^2$/s (218 cSt), ex BP Chemicals Lid), maleic anhydride (30.5 g) and allyl succinic anhydride (5 g, an adduct of propylene and succinic anhydride, hereafter "Allyl-SA") were placed in a 300 ml Parr autoclave which was then purged, sealed and heated to 235° C. with stirring. Exactly the same procedure as used in CT4 above was used to work-up the reaction mixture. The stripped, filtered product had an acidity of 71.7 mg KOH/g and the total amount of tar recovered was 19.6 g. In the stripping step, 4 g of unreacted maleic anhydride was recovered. The final reaction pressure developed was about 180 psig.

CT6. Parapol® 950 polybutene (100 g, Mn=935 by GPC, ex Exxon Chemicals), maleic anhydride (31.4 g) and allyl succinic anhydride (5 g, "Allyl-SA") were placed in a 300 ml Parr autoclave which was then purged, sealed and heated to 235° C. with stirring. Exactly the same procedure as used in CT5 above was used to work-up the reaction mixture. The stripped, filtered product had an acidity of 63 mg KOH/g and the total amount of tar recovered was 19.3 g. In the stripping step, 5.3 g of unreacted maleic anhydride (which may have been contaminated with traces of allyl succinic anhydride) was recovered. The final reaction pressure developed was about 240 psig. The following Tests were carried out at atmospheric pressure:

CT7. Hyvis® 10 polybutene (200 g, Mn=924 by GPC, viscosity 218 mm$^2$/s (218 cSt), ex BP Chemicals Ltd) and maleic anhydride (32.6 g) were placed in a three-necked flask equipped with a magnetic stirrer and air condenser and a thermocouple connected to a Eurotherm temperature controller which controlled the flask temperature. The flask was heated to 213°±1° C. and stirred when maleic anhydride began to reflux and refluxing was continued for 5 hours. Thereafter, free unreacted maleic anhydride was distilled off carefully under reduced pressure and the flask cooled to about 80° C. Heptane was then added to the contents of the flask and well mixed. The resulting mixture (approximately 60/40 v/v of heptane was filtered through a glass filter which retained any solids. The flask was washed with heptane and the washing passed through the filter. The resulting precipitate was washed with heptane. The solid on the walls of the flask was dissolved in acetone and placed in a Buchi rotavapor whereby solvent and unreacted maleic anhydride were removed under vacuum by stripping, the temperature finally reaching 200° C. The remaining solid in the rotavapor was tar (5.2 g). The solid on the filter was also dissolved in acetone and placed in a Buchi rotavapor whereby solvent and unreacted maleic anhydride were removed under vacuum, the temperature finally reaching 200° C. The remaining solid in the rotavapor was tar (1.6 g). The total tar from this process was (5.2 g+1.6 g)=6.8 g.

CT 8. Atactic polypropylene (37 g, Mn=1205 by VPO) and maleic anhydride (4 g) were placed in a 250 ml three-necked flask equipped with a magnetic stirrer, an air condenser and a thermocouple connected to a temperature controller for the flask heater. The mixture was stirred and maintained at a temperature of 210° C. for 2 hours. Initially maleic anhydride condensed on the upper parts of the flask and was washed off by swirling the flask from time to time. The contents of the flask were always kept under an atmosphere of nitrogen. After 2 hours, a further aliquot of maleic anhydride (2 g) was added to the flask and the heating and stirring continued for a further 1 hour and 50 minutes. The flask was then cooled and an equal volume (equal to product volume) of heptane added which was then well mixed. Maleic anhydride and an insoluble maroon tar were observed in suspension in the flask. The contents of the flask were then filtered and the precipitate washed with heptane twice. The precipitate was then dissolved in acetone and the solvent and unreacted maleic anhydride were removed under vacuum by stripping in a Buchi evaporator during which process a final temperature of 200° C. was attained. The weight of tar remaining in the evaporator flask was 0.4 g. The reaction flask upon visual inspection had no adhering tar. The heptane filtrate and heptane washings were combined and placed in a Buchi rotavapor to remove heptane under vacuum and a final stripping temperature of 200° C. was used over 1 hour. The product was then cooled and the found to be cloudy in appearance.

CT9. Hyvis® 10 polybutene (200 g, Mn=924 by GPC, viscosity 218 mm$^2$/s (218 cSt), ex BP Chemicals Ltd), maleic anhydride (30.8 g) and allyl succinic anhydride (7.5 g, "Allyl-SA") were placed in a round-bottomed, three-necked flask equipped with a magnetic stirrer and air condenser and a thermocouple. The contents of the flask were heated to 220° C. (under reflux) with stirring and held at this temperature for 5 hours. Thereafter, the reaction mixture was subjected to slow distillation under partial vacuum at 210° C. to remove unreacted maleic anhydride and some allyl anhydride. Finally, the pressure was held at 3 mmHg for forty-five minutes. The contents of the flask were allowed to cool to about 80° C. An equal volume of heptane was then added to the contents of the flask and well mixed. The resulting mixture was filtered through a glass frit and the precipitate then washed twice more with heptane. The precipitate so washed was then dissolved in acetone and the acetone solution placed in a Buchi rotavapor where acetone solvent and unreacted maleic anhydride were removed under vacuum and the rotavapor was held at a final temperature of 200° C. for 1 hour. The total amount of tar remaining on the rotavapor was 10.1 g. The flask surface was discoloured by small amount of a tarry skin.

Examples 7–8

At atmospheric pressure:

7. Hyvis® 10 polybutene (200 g, Mn=924 by GPC, viscosity 218 mm²/s (218 cSt), ex BP Chemicals Ltd), maleic anhydride (32.6 g) and dodecene (20 g) were placed in a three-necked equipped with a magnetic stirrer, thermocouple and air condenser. Exactly the same work-up procedure as described in CT8 was followed. The amount of filtered tar obtained was 2 g and the amount of tar adhering to the flask was 0.3 g giving a total tar of 2.3 g.

8. Atactic polypropylene (31.5 g, Mn=1205 by VPO), maleic anhydride (3.7 g) and octadecene (1.3 g) were placed in a 250 ml three-necked flask equipped with a magnetic stirrer, an air condenser and a thermocouple connected to a temperature controller for the flask heater. The mixture was stirred and maintained at a temperature of 210° C. for 2 hours. Initially maleic anhydride condensed on the upper parts of the flask and was washed off by swirling the flask from time to time. The contents of the flask were always kept under an atmosphere of nitrogen. After 2 hours, a further aliquot of maleic anhydride (2 g) was added to the flask and the heating and stirring continued for a further 1 hour and 50 minutes. The flask was then cooled and 160 ml of heptane was added and mixed well. The flask contents were filtered and the precipitate washed with heptane. The filtrate and washings were placed in a Buchi rotavapor and the solvent removed stripping during which the temperature of the vacuum strip was allowed to rise to 200° C. and maintained at that temperature for 1 hour. The resultant product was clear and non-hazy. The washed precipitate was dissolved in acetone and placed in a Buchi rotavapor to remove acetone and unreacted maleic anhydride. After vacuum stripping to a final temperature of 210° C. for 1 hour, the weight of tar remaining in the rotavapor was 80 mg. No tar was observed in the original reaction flask.

The results obtained in the above Examples and Comparative Tests are tabulated below for ease of comparison. In the tables the following abbreviations have been used: IB-SA -Isobutenyl succinic anhydride Allyl-SA-Allyl succinic anhydride DD-SA-Dodecenyl succinic anhydride Summary of results For ease of comparison, the results in the Tables below have been normalised to the values of tar, maleic anhydride used and unreacted maleic anhydride obtained when using 100 g of polyisobutene starting material during the maleinisation reaction.

| Nos. | Additive | Polymer | At superatmospheric pressures: | | |
|---|---|---|---|---|---|
| | | | Tar (g)/ 100 g PIB | MA Used (g)/100 g PIB | Unreacted MA(g)/ 100 g PIB |
| 1 | Octadecene | Parapol | 2.25 | 31 | 15.1 |
| 2 | Octadecene | Hyvis 10 | 2.4 | 30.5 | 14.9 |
| 3 | Octadecene | Ultravis 10 | 3.6 | 32.3 | NM |
| 4 | Dodecene | Hyvis 10 | 5.1 | 30.5 | 9.5 |
| 5 | DD-SA | Parapol | 8.1 | 31.4 | 10.2 |
| 6 | DD-SA | Hyvis 10 | 2.5 | 30.5 | 13.5 |
| CT1 | None | Parapol | 10.8 | 30.9 | 7.65 |
| CT2 × (6) | None | Hyvis 10 | 11.9 | 31.8 | 7.25 |
| CT3 | None | Ultravis | 10.9 | 32 | NM |
| CT4 | IB-SA | Hyvis 10 | 22.7 | 30.5 | 5.4 |
| CT5 | Allyl-SA | Hyvis 10 | 19.6 | 30.5 | 4 |
| CT6 | Allyl-SA | Parapol | 19.3 | 31.4 | 5.3 |

NM - Not measured
PIB - Polyisobutene

| Tests Nos. | Additive | Polymer | At atmospheric pressures: | |
|---|---|---|---|---|
| | | | Tar (g)/ 100 g PIB or PP | MA Used (g)/ 100 g PIB or PP |
| 7 | Dodecene | Hyvis 10 | 1.15 | 16.3 |
| 8 | Octadecene | Polypropylene | 0.25 | 11.75 |
| CT7 | None | Hyvis 10 | 3.4 | 16.3 |
| CT8 | None | Polypropylene | 1.08 | 10.8 |
| CT9 | Allyl SA | Hyvis 10 | 5.05 | 15.4 |

PIB - Polyisobutene
PP - Polypropylene

The above results clearly show that in each case, the performance in terms of tar reduction of a reaction system for producing maleinised polyolefins with the additives of the present invention is superior to the performance of the same system without the additives or with other additives not forming part of the present invention. These results also show that the recovery of unreacted maleic anhydride is significantly improved thereby improving the economics of the process.

I claim:

1. A process for making substituted acylating agents having a substantially reduced amount of resins by the thermal reaction of an enophile containing at least one carboxyl group and capable of forming resins under the reaction conditions with a polyolefin selected from polypropylene and poly(iso)butene, said process comprising adding to the reaction mixture comprising the enophile and the polyolefin at least:

a. one olefin of the formula (I):

$$(R)(R^1).C=C.(R^2)(R^3) \qquad (I)$$

wherein at least one of R, $R^1$, $R^2$ and $R^3$ is hydrogen and at least one of the other three is i. an alkyl group having at least 3 carbon atoms, or, ii. at least one of $R^2$ and $R^3$ together with $R^1$ forms a cycloaliphatic ring such that the olefin has at least 5 carbon atoms in a linear hydrocarbyl chain, or, b. one adduct of said olefin of formula (I) with the reactant enophile.

2. A process according to claim 1 wherein the enophile containing at least one carboxyl group which is reacted with the polyolefin in a thermal reaction is a carboxylic acid or an anhydride which has at least one active unsaturated linkage capable of enophilic addition to the polyolefin.

3. A process according to claim 1 wherein the enophile is maleic acid or maleic anhydride.

4. A process according to claim 1 wherein the polyolefin is a poly(iso)butene which has >20% of the chains with terminal unsaturation and has a number average molecular weight of at least 500.

5. A process according to claim 1 wherein the reactant olefins of formula (I) comprise at least one, olefin having from 5–30 carbon atoms.

6. A process according to claim 1 wherein the amount of olefins of formula (I) or an adduct thereof with the reactant enophile added to the reaction mixture comprising the enophile and the polyolefin is in the range from 0.1 to 10% w/w of the total polyolefins in the reaction mixture.

7. A process according to claim 1 wherein the olefin of formula (I) or the adduct thereof with the reactant enophile is added to the reactants before or during the reaction between the enophile and the polyolefin.

8. A process according to claim 1 wherein the temperature of the reaction between the enophile and the polyolefin is in the range from 100° to 240° C.

9. A process according to claim 1 wherein the reaction is carried out in the substantial absence of free radicals or free-radical precursors.

10. A process according to claim 1 wherein the the substituted acylating agent is a polypropenyl succinic anhydride or a poly(iso)butenyl succinic anhydride.

* * * * *

UNITED STATES PATENT AND TRADEMARK OFFICE
CERTIFICATE OF CORRECTION

PATENT NO. : 5,519,092
DATED : May 21, 1996
INVENTOR(S) : JOHN R. BLACKBOROW

It is certified that error appears in the above-indentified patent and that said Letters Patent is hereby corrected as shown below:

Col. 1, l. 60, strike "herein" and insert --free-- before "from"

Col. 2, l. 43, correct the spelling of the word "enopohile"

Col. 3, l. 19, should read "can have > 20%"

Col. 5, l. 52, correct the spelling of "Ltd)"
Col. 9,
Claim 5, line 2, strike the comma (,) after "one"
Col 10,
Claim 10, line 1, after "wherein" strike a "the"

Signed and Sealed this

Eighth Day of October, 1996

Attest:

BRUCE LEHMAN

Attesting Officer     Commissioner of Patents and Trademarks